March 20, 1962 A. TEDESCHI ET AL 3,026,423

ACTIVE CONTROL CIRCUIT

Filed June 18, 1958 2 Sheets-Sheet 1

INVENTORS
ANTHONY TEDESCHI
JOHN D. KEATING

BY Gravely, Lieder & Woodruff
ATTORNEYS

March 20, 1962 A. TEDESCHI ET AL 3,026,423

ACTIVE CONTROL CIRCUIT

Filed June 18, 1958 2 Sheets-Sheet 2

*INVENTORS*
ANTHONY TEDESCHI
JOHN D. KEATING

BY Gravely, Lieder & Woodruff
ATTORNEYS

3,026,423
ACTIVE CONTROL CIRCUIT

Anthony Tedeschi, Fort Worth, Tex., and John D. Keating, University City, Mo., assignors to McDonnell Aircraft Corporation, St. Louis, Mo., a corporation of Maryland Filed June 18, 1958, Ser. No. 742,784
8 Claims. (Cl. 307—88.5)

The present invention relates generally to active control circuits and more particularly to an active control circuit which is compatible with other active and passive circuits.

Because of the low impedance characteristics normally associated with active circuits generally and particularly with circuits having semi-conductive components such as transistors and the like, it has heretofore been difficult, if not wholly unsatisfactory, to connect such circuits in tandem arrangement. Furthermore, the known circuits have used components which are expensive, bulky, and unsuitable in circuit mazes where the size and weight of the elements becomes important.

It is therefore an object of the present invention to overcome these known undesirable characteristics of active control circuits and to provide an active circuit that is fully compatible with other active and passive circuits.

Another object of the invention is to provide a transistor control circuit that operates over a predetermined range of frequencies independently of the equivalent transistor impedance.

Another object of the invention is to provide a reliable active control circuit that is inexpensive to construct, lightweight and compact.

Another object of the present invention is to provide a technique whereby the phase and amplitude characteristics of a lag transfer function can be obtained by a network employing active and passive components.

Another object of the present invention is to provide a direct current balanceable semi-conductor control network consisting of active and passive components having a lag transfer function between input and output, which lag transfer function depends on current characteristics which are more or less constant over the selected frequency range and with changes in temperature.

Other objects and advantages of the present invention will become apparent after considering the following detailed specification and accompanying drawings.

Figure 1:
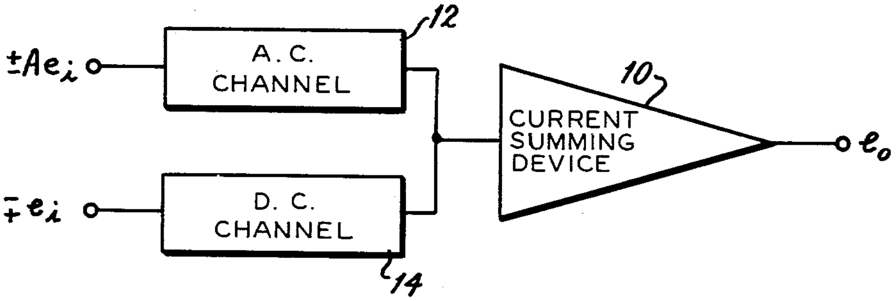
FIG. 1 is a block diagram illustrating the relation of more important components of the present circuit.
Figure 2:
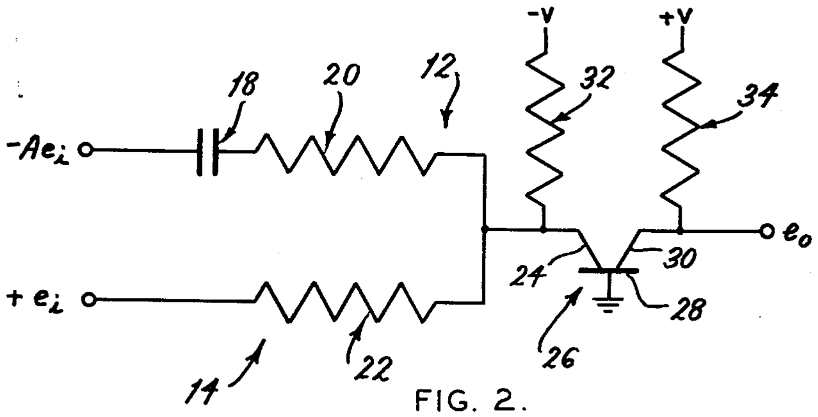
FIG. 2 is a schematic wiring diagram illustrating a particular form of the present invention.
Figure 3:
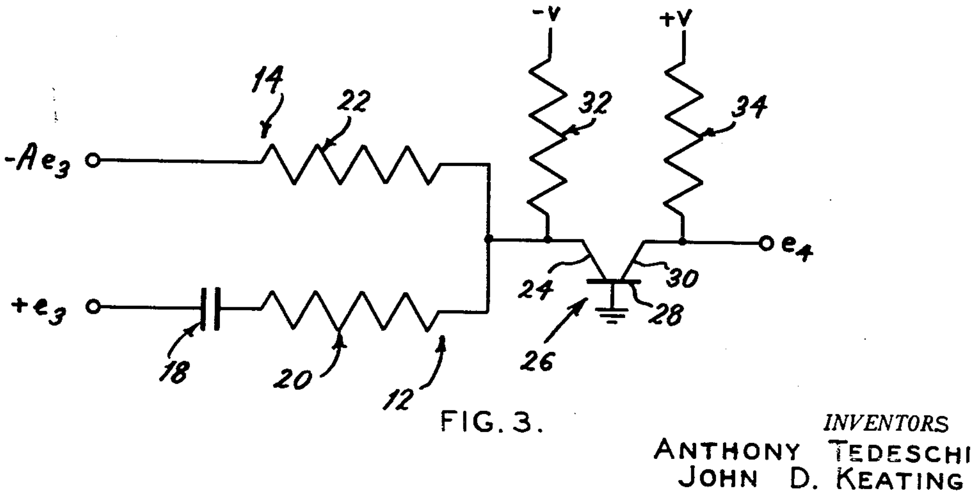
FIG. 3 is a schematic wiring diagram illustrating yet another form of the present invention.

Referring now to the drawings by reference numerals, the block 10 (FIG. 1) refers to the active component of the present invention, and blocks 12 and 14 refer respectively to a passive A.-C. input channel and a passive D.-C. input channel, both of which are connected to the input of the active component 10. An input signal from an external source is fed to each of the input channels 12 and 14. The source of these input signals can be a signal generator, another active network, a vacuum tube circuit, or any other source capable of producing suitable signals having low output impedances. The suitability of the two input signals depends primarily upon their phase relationship. In order to be suitable for producing a lag transfer function, it is necessary, as will be shown, that the input signal to channel 12 be 180° out of phase with respect to the input signal fed to channel 14 over the range of frequencies being used. In FIGS. 1, 2 and 3 the out-of-phase relationship between the inputs is illustrated by designating one input $\pm Ae_1$ and the other by $\mp e_1$. The summation of the plus and minus components (as will be shown) produces an output signal $e_o$ of the active component 10 which lags the input.

The A.-C. input channel 12 is shown in FIG. 2 as constructed of a series combination of a capacitor 18 and a resistor 20, and the D.-C. input channel 14 of the resistor 22. Both the A.-C. channel 12 and the D.-C. channel 14 are connected to an emitter terminal 24 of a transistor 26. The transistor 26 (which is the active component and which is current controlled) has a grounded base 28, and a collector terminal 30 on which the output $e_o$ appears. The emitter terminal 24 is also connected to a biasing resistor 32, and the collector terminal 30 is connected to a load resistor 34.

The transistor 26 is of the NPN junction type which has two outer negatively charged layers or pellets and a thin positively charged layer or pellet therebetween. It is anticipated that a PNP junction type transistor which reverses the layer arrangement or any other suitable semi-conductor component could be substituted in place of the NPN transistor 26 for producing a similar lag transfer function. It is necessary, however, that a semi-conductor element, such as a transistor, be used for the active component because of the current characteristics which distinguish them from vacuum tubes and the like. If a PNP transistor is substituted for the NPN transistor 26 shown in FIG. 2, it would, of course, be necessary to reverse the polarity of the biasing voltage in order to produce an operative condition.

Figure 4:
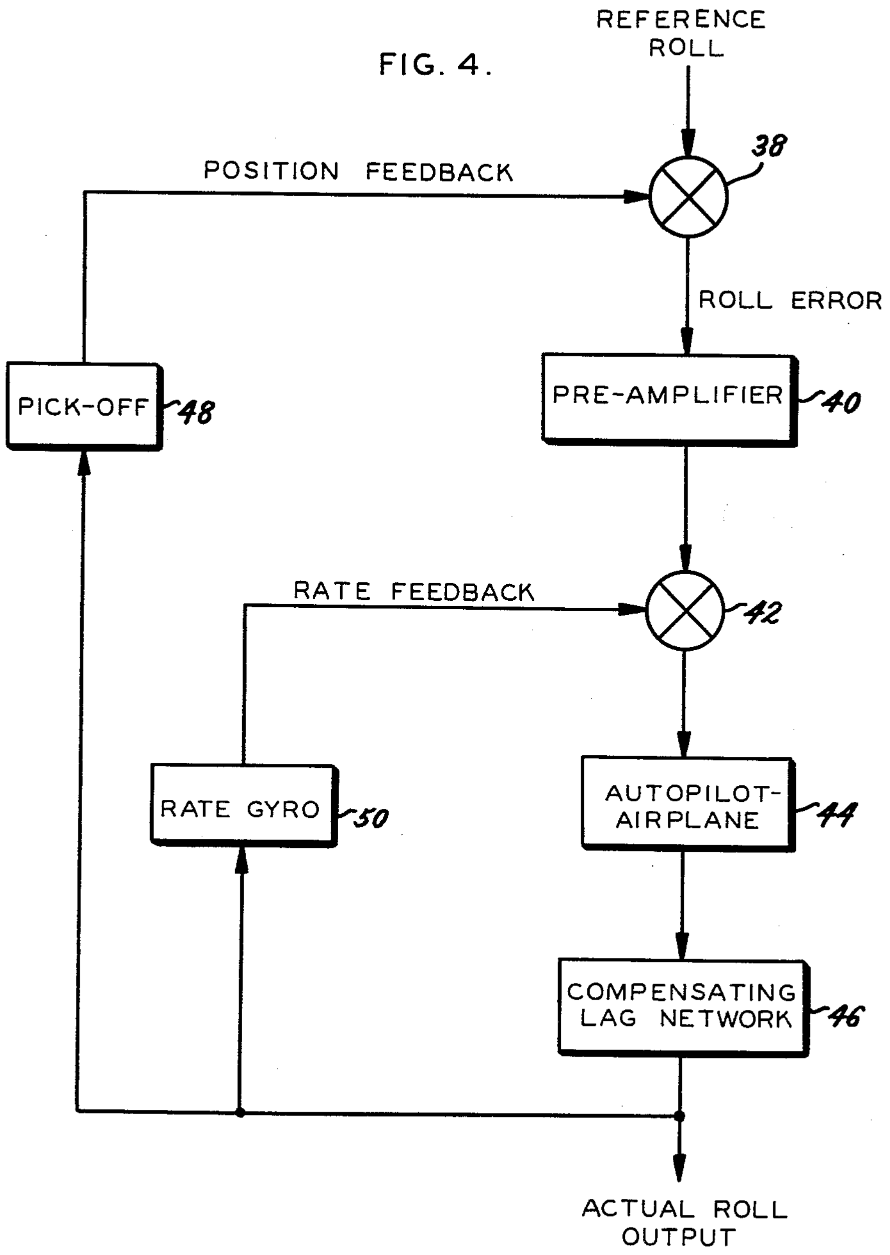
FIG. 4 is a block diagram of an auto-pilot control system illustrating a typical use of the inventive circuit.

The circuit shown in FIG. 4 illustrates schematically how the inventive circuit might be employed in a specific situation but is not intended to limit its use to such a device. The system shown in FIG. 4 is for controlling the roll of an airplane and might be incorporated as part of any known automatic piloting device. The member 38 is a device that indicates the amplitude or amount of roll of the airplane with respect to a known reference point. The output from member 38 is fed to an amplifying circuit 40, and then to another deviation indicating device 42 which indicates how rapidly the roll should be corrected. If, for example, the roll were to be corrected too rapidly, there might be a tendency to overshoot the mark and thereby cause the plane to oscillate.

The output of the device 42 is fed into an autopilot device 44. Instead of feeding the output of the autopilot device directly to the airplane controls which is done in known autopilot devices, it is fed into a compensating lag network 46 of the type taught by this invention. The output signal of the lag network 46 contains two components which produce the controlling action. One component which varies in amplitude with the amount of roll deviation (as indicated by member 38) is fed back through a circuit 48 to the member 38. This component may be thought of as being analogous to the feedback produced by an automatic volume control.

The other component of the output from the network 46 is fed back through a rate gyro circuit 50 and into the device 42. This component of the output, which is frequency responsive and which lags behind the input roll signal deviation, determines the rate at which the roll deviation is to be corrected.

It is important to bear in mind that a transistor is normally thought of as a current amplifying device as opposed to a vacuum tube which is primarily thought of as a voltage amplifier. It is also important to remember that a current amplifier, such as grounded base junction transistor 26, has an inherently low input impedance. Therefore, in order to write an equation which will present the relationship (both as to phase and magnitude) of the input signal and the output signal, it is necessary to take into consideration the current amplifying characteristic. A very general equation representing the output signal in terms of the input signal and the transfer function of the device may be written as follows:

(1) $e_o = (e_i) \cdot (\text{lag transfer function})$

In Equation 1, $e_o$ represents the output signal and $e_i$ the input signal. This very general equation can be mathematically rewritten as follows:

(2)

$$\frac{e_o}{e_i} = K\frac{1+dT_{1/dt}}{1+dT_{2/dt}} = K\left[1 - \frac{(T_2-T_1)}{T_2}\,\frac{(dT_{2/dt})}{(1+dT_{2/dt})}\right]$$

In Equation 2, $T_1$ and $T_2$ represent time constants in the alternating current channel 12 and in the alternating current channel in conjunction with other circuit components. It is also assumed in the writing of the equations that the input source has a relatively low impedance. In order that the transfer function be a lagging function instead of a leading function, a further limitation must be made, namely that $T_2$ be larger than $T_1$ and that $T_1$ be larger or equal to zero. When this occurs, a minus sign appears in the above bracketed expression instead of a plus sign. The minus sign indicates a lag whereas a plus sign would indicate a lead. If $T_1$, on the other hand, were made equal to $T_2$, then $e_o$ would equal $e_i$ and they would both be in phase. K is simply an arbitrary constant multiplier.

Referring again to the bracketed expression in Equation 2, it is seen that there is a constant term represented by the $K \cdot 1$, and a variable term preceded by K times the negative (—) expression. The constant term represents a D.-C. relationship between the input and output signals and the variable term represents a lagging A.-C. relationship.

Equation 2 above can now be written as Equation 3, which is more specific, to cover the circuit shown in FIG. 2. In order to understand the derivation of Equation 3, it is helpful to consider the circuit shown in FIG. 2 as representing an equivalent pi ($\pi$) or T network and to apply the well known short circuit and open circuit four-terminal network analysis. Certain assumptions are made when applying equivalent theory to the device shown in FIG. 2 in order to arrive at Equation 3. For example, it is assumed that the equivalent collector resistance ($r_c$) of the transistor 26 is very large compared to the equivalent transistor base resistance ($r_b$). Furthermore, it is assumed that the transistor equivalent emitter resistance including any added emitter resistance ($r_e+R_e$) is very large compared to $r_b$. Making these assumptions, Equation 3 may be written:

(3) $$\frac{e_i}{e_o} = \frac{\alpha(r_c)}{r_c+R_L}\cdot\frac{R_L}{R_1}\left[1 - \frac{(AR_1)}{R_2}\,\frac{dR_2C_{2/dt}}{1+dR_2C_{2/dt}}\right]$$

In Equation 3, alpha ($\alpha$) is the small signal short circuit current gain under grounded base condition ($i_o/i_i$), $r_c$ is the small signal equivalent collector resistance of the transistor, $R_L$ is the load resistor 34, $R_1$ (which is the same as $R_e$) is the D.-C. input channel 14 resistor 22, $R_2$ and $C_2$ are the A.-C. input channel 12 resistor 20 and capacitor 18 respectively. The resistor 32 ($R_B$) is a biasing resistor and should be very much larger than the input impedance of the transistor. The minus sign (—), again indicates a lag transfer function, and separates the D.-C. from the A.-C. components in Equation 3. The A.-C. component, as expected, varies in magnitude as a function of time as indicated by the Laplacian operators ($d/d_t$).

Equating similar terms in Equations 2 and 3:

(4) $$K = \frac{\alpha(r_c)}{r_c+R_L}\cdot\frac{R_L}{R_1}$$

Solving for $R_L$ in Equation 4:

(5) $KR_1(r_c+R_L) = \alpha r_c R_L$ (6) $\alpha R_L r_c - KR_1R_L = KR_1r_c$ (7) $$R_L = \frac{KR_1r_c}{\alpha r_c - KR_1}$$

The constant multiplier K may be arbitrarily chosen to meet a particular load condition. If, for example, $KR_1$ approaches the value of $\alpha r_c$, the load $R_L$ approaches infinity. If, on the other hand, $KR_1$ is very small with respect to $\alpha r_c$, $R_L$ depends upon the value of the expression $KR_{1/\alpha}$ which is fairly constant over a selected frequency range with changes in temperature. Therefore, by proper selection of elements, the inventive device can be designed to operate with nearly any load.

Heretofore it has been difficult to construct a transistor circuit which is compatible with other transistor circuits, vacuum tube circuits, and the like because of the low impedance characteristic of transistors. With the inventive device, as illustrated in the accompanying circuit diagrams, an active lag network is provided that can be adjusted to be compatible with any other circuit. This is true, as illustrated above, because the load $R_L$ can be made to assume any value depending upon the selection of values for the various circuit parameters. In this respect the present invention has its most important advantage.

In addition to being compatible with other circuits because of the broad selection of loads now made available for an active element, the present active circuit also affords a saving in both space and weight of the elements employed. The biasing resistor 32 ($R_B$) is adjusted in advance in order to balance out, and not necessarily to eliminate, the D.-C. current flowing in the input channels. This balancing enables polarized capacitors to be employed, which are appreciably smaller in size and weight than regular capacitors. The reduced size and weight becomes an important consideration particularly where the inventive circuit is used in a maze control network that must be fitted into a small space.

The circuit shown in FIG. 3 is a variation of the circuit shown in FIG. 2 showing the negative input signal being fed to the D.-C. channel 14 instead of to the A.-C. channel 12. Otherwise the circuits are the same. The equation representing the lag transfer function of FIG. 3 is represented as follows:

(8) $$\frac{e_4}{e_3} = \frac{\alpha A(r_c)}{r_c+R_L}\cdot\frac{R_L}{R_1}\left[1 - \frac{R_1}{AR_2}\,\frac{(dR_2C_{2/dt}}{1+dR_2C_{2/dt}}\right]$$

Equation corresponding terms (9) $$K = \frac{\alpha A(r_c)}{r_c+R_L}\cdot\frac{R_L}{R_1}$$

Solving for $R_L$

(10) $$R_L = \frac{KR_1r_c}{(\alpha Ar_c - KR_1)}$$

Again, as the product $KR_1$ approaches the value of $\alpha Ar_c$, the load resistance 34 ($R_L$) approaches infinity. The principal difference between the solution for the load resistance $R_L$ as shown in FIGS. 2 and 3 is that for FIG. 3, $\alpha r_c$ is multiplied by a gain factor A. As a result, $R_L$ for circuit (3) is always smaller than it is for the circuit shown in FIG. 2, if the other circuit constants remain equal and if the gain factor A exceeds unity.

Within the limits of the assumptions made in deriving the voltage transfer Equations 3 and 8, and when the load resistor $R_L$ is small compared to $r_e$; $r_c$ cancels out of the equations. This means that the transfer function under these conditions is substantially independent of $r_c$ and depends instead on alpha ($\alpha$) and the passive element parameters. Furthermore, with a grounded base transistor, alpha ($\alpha$) (the short circuit current gain under grounded base conditions) is a more constant transistor parameter with respect to temperature than beta ($\beta$) which is the short circuit current gain under grounded emitter conditions and which is not very constant with temperature changes.

It is anticipated that certain changes and alterations could be made in the present invention by those skilled in the art without departing from the scope or spirit thereof, all such alterations and changes which do not depart from the broad scope and spirit of the present invention are deemed to be fully covered by this disclosure, the coverage being limited only by the claims which follow.

What we claim is:

1. A current operated circuit which can be made to operate compatibly with other current and voltage operated circuits regardless of the impedance of the other circuits comprising a semiconductor member having a grounded base element, an input element and an output element having an output impedance characteristic, an input circuit including a first channel having a passive resistive member therein and a second channel having passive resistive and reactive members therein, means connecting each of said input channels to the input element, means also connecting each of said input channels to a relatively low impedance signal source capable of generating an input signal of one phase to one of said input channels and an input signal of opposite phase to the other of said input channels, means biasing the input and output elements, and means connecting the output element to a load circuit, the impedance of said load circuit being matched to the output impedance at the output element by proper selection of parameters of the passive circuit members only being substantially independent of the characteristics of the semi conductor member.

2. A current summing device comprising active and passive elements, said active element including a transistor having a grounded base, an emitter electrode, and a collector electrode; input circuit means connected to one of said electrodes including signal generating means capable of generating input signals of opposite phase relationship, a pair of input channels connected between the generating means and said one electrode including passive circuit components, means biasing the emitter and collector electrodes to selected voltages, an output circuit connected to the other of said electrodes including a passive load component, the impedance of said load component being matched to the impedance of the current summing device by proper selection of the parameters of the passive circuit components only.

3. A current summing device comprising active and passive elements, said active element including a transistor having a grounded base, an emitter, and a collector; an input circuit connected to the emitter including a signal generator capable of generating two signals of opposite phase, circuit means including passive circuit members connected between the signal generator and the emiter, said circuit means including a pair of input channels connected between the signal generator and the emitter, one of said channels having a passive resistive element therein and the other of said channels having a passive reactive element therein, means biasing the emitter to a selected voltage, and an output circuit connected to the collector including an output terminal and a passive load member, the impedance as seen from the output terminal being substantially entirely a function of the parameters of the passive circuit members.

4. A current summing device comprising active and passive elements, said active element including a semi conductor having a grounded base, an emitter with an emitter terminal, and a collector with a collector terminal, an input circuit connected to one of said terminals including a signal source generating a signal having two components of opposite phase, a direct current circuit including a passive element connected between the source and one of said terminals for passing one of said input signal components, an alternating current circuit including a different passive element connected between the source and said one of said terminals for passing the other of said input signal components, the alternating current circuit and the current summing device as a whole having different time constants, means biasing the emitter and the collector into an operative condition, the impedance of the current summing device as seen at the collector terminal being substantially entirely a function of the parameter's of the passive circuit elements.

5. A current summing circuit comprising a transistor having a grounded base, an emitter element and a collector element; an alternating current input channel including resistive and reactive members connected to one of said elements, and a direct current input channel including a resistive element connected to the same one of said elements, a low impedance input signal source connected to said input channels and generating a signal of one phase and frequency to the alternating current input channel and a signal of the same frequency but opposite phase to the direct current channel, means biasing the emitter and collector elements, and an output circuit connected to the other of said elements.

6. The current summing circuit of claim 5 wherein said alternating current input circuit includes a resistor member connected in series with a capacitor member.

7. A current operated circuit comprising a semi conductor having an input element, an output element, and a grounded base element, an input circuit connected to the input element including a direct current channel having a resistor therein and an alternating current channel having a resistor and a capacitor connected in series therein, a first signal source generating a signal of a selected frequency connected to the direct current channel, a second signal source generating a signal of substantially the same frequency but opposite phase connected to the alternating current channel, means biasing the input and output elements to an operating condition, and a load circuit connected to the output element, the impedance of said load circuit being capable of being balanced to the current operated circuit by selection of the parameters of the resistors and capacitors in the circuit.

8. A current operated circuit capable of producing a lag between an input signal and an output signal comprising a transistor having an input element, an output element and a grounded base element, an input circuit connected to the input element including a direct current channel and an alternating current channel, a first input signal source connected to the direct current channel capable of generating a first input signal of a desired frequency, a second input signal source connected to the alternating current channel capable of generating a second input signal of substantially the same frequency as the first input signal but of opposite phase, means biasing the input and output elements of the transistor to an operating condition whereby the transistor responds to the out-of-phase input signals to produce an output signal that lags behind the input signals, and a load circuit connected to the output element and excited by the lagging output signal, the impedance of said load circuit being balanced to the current operated circuit independently of the characteristics of the transistor.

References Cited in the file of this patent

UNITED STATES PATENTS

| | | |
|---|---|---|
| 2,737,601 | McMahon | Mar. 6, 1956 |
| 2,860,261 | Verkruissen | Nov. 11, 1958 |
| 2,862,109 | Kruper | Nov. 25, 1958 |
| 2,909,676 | Thomas | Oct. 20, 1959 |